(12) United States Patent
Andrasko et al.

(10) Patent No.: US 8,428,836 B2
(45) Date of Patent: Apr. 23, 2013

(54) DRIVELINE PROTECTION SYSTEMS AND METHODS USING MEASURED STEERING ANGLE

(75) Inventors: Steven J. Andrasko, Wixom, MI (US); Brent T. Deep, Fenton, MI (US); Scott M. Neher, Troy, MI (US); Jason P Hafer, Gaines, MI (US)

(73) Assignee: GM Global Technology Operations LLC

( * ) Notice: Subject to any disclaimer, the term of this patent is extended or adjusted under 35 U.S.C. 154(b) by 884 days.

(21) Appl. No.: 12/560,693

(22) Filed: Sep. 16, 2009

(65) Prior Publication Data

US 2011/0066338 A1 Mar. 17, 2011

(51) Int. Cl.
*G06F 7/00* (2006.01)

(52) U.S. Cl.
USPC ............................................. 701/54; 701/84

(58) Field of Classification Search .................... 701/54, 701/84, 89
See application file for complete search history.

(56) References Cited

U.S. PATENT DOCUMENTS

| 5,555,499 | A  | * | 9/1996 | Yamashita et al. | 701/84 |
| 7,089,104 | B2 | * | 8/2006 | Post et al. | 701/84 |
| 8,095,287 | B2 | * | 1/2012 | Beechie et al. | 701/65 |
| 8,170,767 | B2 | * | 5/2012 | Meyers et al. | 701/78 |

* cited by examiner

*Primary Examiner* — Mark Hellner

(57) ABSTRACT

An engine control system comprises a limit determination module and a torque control module. The limit determination module selectively varies a torque limit based on a steering angle. The torque control module selectively limits torque output by an engine to the torque limit.

19 Claims, 4 Drawing Sheets

DRIVELINE PROTECTION SYSTEMS AND METHODS USING MEASURED STEERING ANGLE

FIELD

The present disclosure relates to internal combustion engines systems and more particularly to engine control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine of a vehicle combusts a mixture of air and fuel to produce torque that is used for propulsion of the vehicle. The engine transfers torque to a transmission. The transmission selectively transfers torque to front and/or rear half shafts of the vehicle. For example, in four-wheel drive or all-wheel drive vehicles, the transmission transfers torque to the front and rear half shafts. Each half shaft receiving torque transfers the torque to an associated wheel of the vehicle to propel the vehicle.

An engine control module (ECM) controls torque output by the engine. For example only, the ECM controls the engine torque output based on actuation of an accelerator pedal within the vehicle. The ECM may also control the engine torque output based on torque requested by various vehicle systems, such as a cruise control system and/or a traction control system.

The ECM may limit the engine torque output to a predetermined maximum torque. The predetermined maximum torque corresponds to a maximum engine torque output. Torque output above this maximum torque may damage the front half shafts during sharp turns. In this manner, the ECM reduces the chance that the front half shafts may be damaged.

SUMMARY

An engine control system comprises a limit determination module and a torque control module. The limit determination module selectively varies a torque limit based on a steering angle. The torque control module selectively limits torque output by an engine to the torque limit.

In other features, the limit determination module determines the torque limit based on the steering angle, and the steering angle is measured by a steering angle sensor.

In still other features, a system comprises the engine control system and the steering angle sensor.

In further features, the steering angle sensor measures the steering angle based on a position of a steering column.

In still further features, the engine control system further comprises a transmission control module and an enabling/disabling module. The transmission control module controls transfer of torque to front and rear wheels of a vehicle. The enabling/disabling module selectively disables the limit determination module when the transmission control module disables the transfer of torque to the front wheels.

In other features, the engine control system further comprises an enabling/disabling module. The enabling/disabling module one of enables and disables the limit determination module based on a drive mode selected for a vehicle.

In still other features, the enabling/disabling module disables the limit determination module when the drive mode is a rear wheel drive mode.

In further features, the enabling/disabling module enables the limit determination module when the drive mode is one of a four-wheel drive mode and an all-wheel drive mode.

In still further features, the torque control module controls fuel supplied to the engine to limit the torque output to the torque limit.

In other features, the torque control module controls spark timing to limit the torque output to the torque limit.

An engine control method comprises selectively varying a torque limit based on a steering angle and selectively limiting torque output by an engine to the torque limit.

In other features, the engine control method of claim 11 further comprises measuring the steering angle using a steering angle sensor and determining the torque limit based on the steering angle.

In still other features, the engine control method further comprises measuring the steering angle based on a position of a steering column.

In further features, the engine control method further comprises controlling transfer of torque to front and rear wheels of a vehicle and selectively disabling the selectively limiting the torque output when the transfer of torque to the front wheels is disabled.

In still further features, the engine control method further comprises one of enabling and disabling the selectively limiting the torque output based on a drive mode selected for a vehicle.

In other features, the engine control method further comprises disabling the selectively limiting the torque output when the drive mode is a rear wheel drive mode.

In still other features, the engine control method further comprises enabling the selectively limiting the torque output when the drive mode is one of a four-wheel drive mode and an all-wheel drive mode.

In further features, the engine control method further comprises limiting an amount of fuel provided to the engine based on the torque limit.

In still further features, the engine control method further comprises controlling spark timing to limit the torque output to the torque limit.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
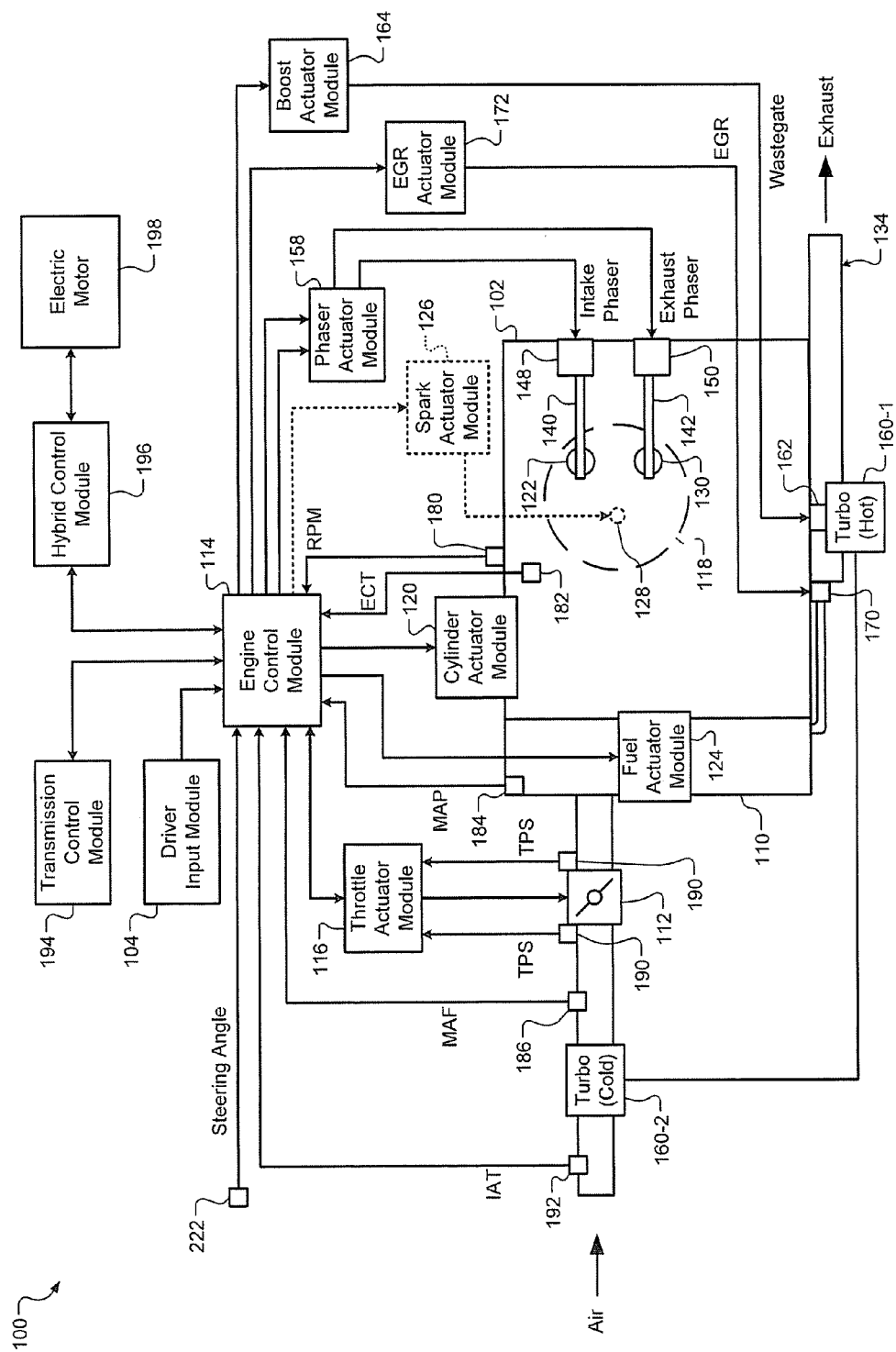
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

An engine controller controls torque output by an engine. When torque is transferred to front wheels of a vehicle, the engine controller selectively varies a torque limit for the engine torque output based on a steering angle. Limiting the engine torque output to the torque limit protects half shafts associated with front wheels of a vehicle.

The engine controller of the present disclosure determines the torque limit based on the steering angle measured by a steering angle sensor. The engine controller limits the engine torque output based on the steering angle. In other words, the engine controller limits the engine torque output to the torque limit. In this manner, the engine controller protects the front half shafts while not unnecessarily restricting a driver's ability to control the engine torque output.

Referring now to FIG. 1, a functional block diagram of an exemplary engine system 100 is presented. The engine system 100 includes an engine 102 that combusts an air/fuel mixture to produce drive torque for a vehicle based on driver inputs provided by a driver input module 104. The driver inputs may include, for example, positions of one or more pedals within a vehicle, such as an accelerator pedal and/or a brake pedal.

Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112. By controlling the opening of the throttle valve 112, the ECM 114 controls the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

Injected fuel mixes with air and creates an air/fuel mixture. A piston (not shown) compresses the air/fuel mixture within the cylinder 118. The air/fuel mixture is combusted within the cylinders to generate torque for propulsion. For example only, heat generated via compression of the air/fuel mixture initiates combustion of the air/fuel mixture in diesel engine systems.

In other engine systems, such as a gasoline engine system, combustion of the air/fuel mixture is initiated by spark. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The combustion of the air/fuel mixture drives the piston down, thereby driving a rotating crankshaft (not shown). After the piston reaches a bottommost position, the piston begins moving up and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger that includes a hot turbine 160-1 and a cold-air compressor 160-2. The hot turbine 160-1 is powered by hot exhaust gases flowing through the exhaust system 134. The cold air compressor 160-2 is driven by the hot turbine 160-1 and compresses air leading into the throttle valve 112. In various implementations, a supercharger, driven by the crankshaft, may compress air from the throttle valve 112 and deliver the compressed air to the intake manifold 110.

A wastegate 162 may be implemented to allow exhaust gas to bypass the hot turbine 160-1, thereby reducing the boost (the amount of intake air compression) of the turbocharger. The ECM 114 controls the turbocharger via a boost actuator module 164. The boost actuator module 164 may modulate the boost of the turbocharger by controlling the position of the wastegate 162. In various implementations, multiple turbochargers and/or other boost devices may be controlled by the boost actuator module 164. The turbocharger may also have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the hot turbine 160-1 and the compressor 160-2 are often attached to each other, placing intake air in close proximity to hot exhaust.

The engine system 100 may also include an exhaust gas recirculation (EGR) valve 170, which selectively directs exhaust gas back to the intake manifold 110. In various engine systems, the EGR valve 170 may be located upstream of the hot turbine 160-1 of the turbocharger. An EGR actuator module 172 controls opening of the EGR valve 170 based on signals from the ECM 114.

The ECM 114 may make control decisions for the engine system 100 based on engine operating parameters measured by various sensors. For example only, an engine speed sensor 180 measures the rotational speed of the crankshaft (i.e., engine speed) in revolutions per minute (RPM). The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where the engine vacuum corresponds to the difference between ambient air pressure and the pressure within the intake manifold 110. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from various sensors in making control decisions.

Figure 2:
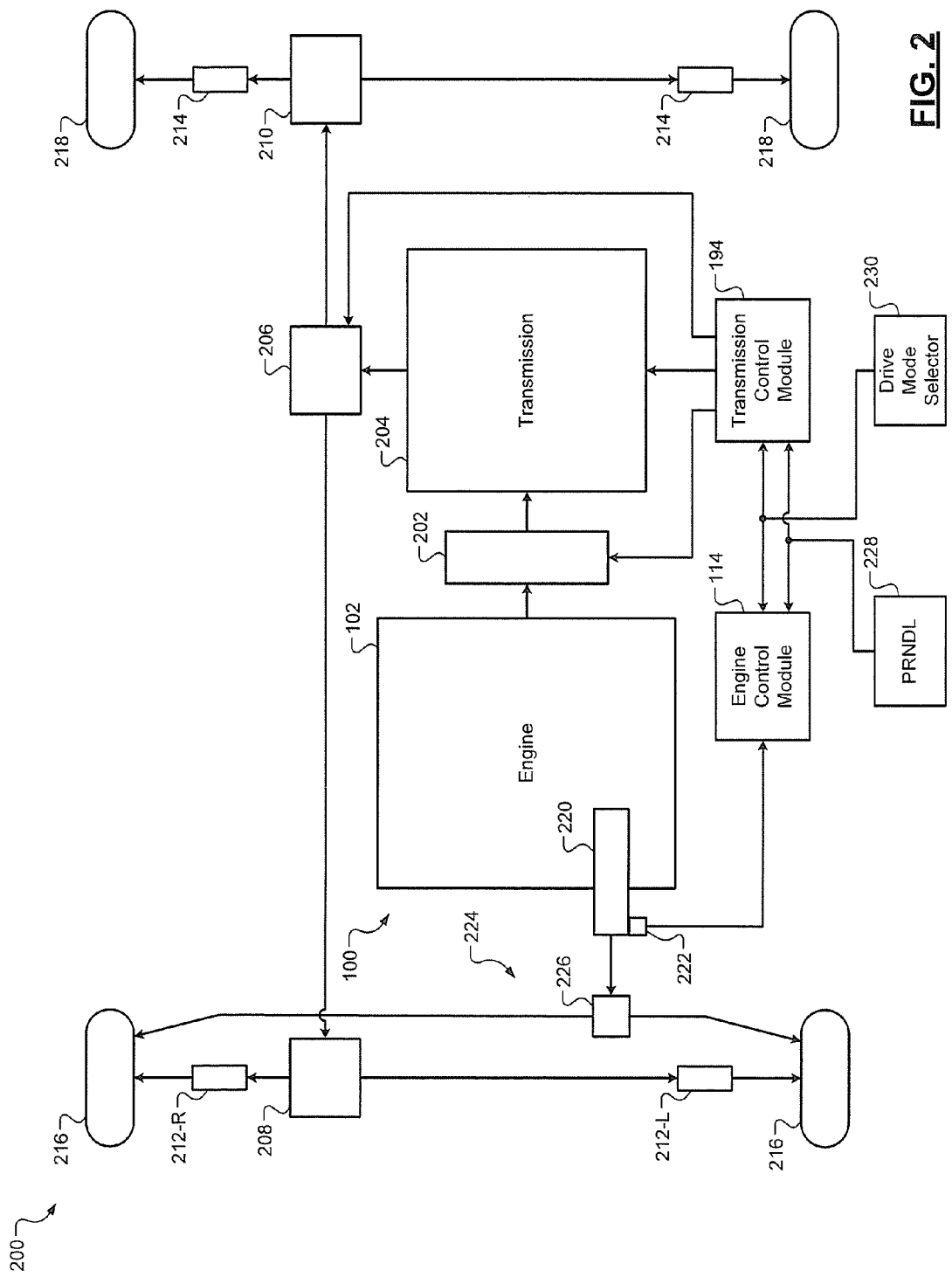
FIG. 2 is a functional block diagram of an exemplary vehicle system according to the principles of the present disclosure.

The ECM 114 may communicate with a transmission control module 194, for example, to coordinate gear shifts in a transmission (See FIG. 2). For example, the ECM 114 may reduce engine torque during a gear shift. The ECM 114 may also communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator. Each actuator receives an actuator value. For example, the throttle actuator module 116 may be referred to as an actuator, and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Referring now to FIG. 2, a functional block diagram of an exemplary vehicle system 200 including the engine system 100 is presented. Through a torque transfer device 202, torque is transferred between the engine 102 and a transmission 204. The torque transfer device 202 may include, for example, one or more clutches and/or a torque converter.

The transmission 204 receives torque output by the engine 102 via the torque transfer device 202 and selectively transfers torque to a transfer case 206. The transfer case 206 transfers torque to a front differential 208 and a rear differential 210. For example only, the transfer case 206 may transfer torque approximately equally between the front and rear differentials 208 and 210 when operating in four or all-wheel drive. In front-wheel drive vehicles, the transmission 204 may transfer torque directly to the front differential 208, and the transfer case 206 and the rear differential 210 may be omitted.

The front differential 208 transfers torque to left and right front half shafts 212-L and 212-R. The left and right front half shafts 212-L and 212-R will be collectively referred to as front half shafts 212. The rear differential 210 transfers torque to rear half shafts 214. The front and rear half shafts 212 and 214 transfer torque to front and rear wheels 216 and 218, respectively.

A driver turns or steers the vehicle using a steering wheel or device (not shown). The steering device is linked to a steering column 220 that rotates as the driver turns the steering device. A steering angle sensor 222 measures the angle (i.e., position) of the steering column 220 and generates a steering angle signal accordingly. The steering angle may be measured relative to a predetermined angle, such as a steering angle at which the vehicle travels in a linear path. The steering angle sensor 222 provides the steering angle to the ECM 114.

The steering column 220 is linked to a steering system 224 that turns the front wheels 216 based on rotation of the steering column 220. The steering column 220 may be mechanically linked to the steering system 224, such as in a rack and pinion steering system. In other steering systems, such as a steer-by-wire steering system, the steering system 224 may be electrically linked to the steering column 220 and/or the steering angle sensor 222. For example only, the steering system 224 in a steer-by-wire system may turn the front wheels 216 based on the steering angle measured by the steering angle sensor 222. A steering mechanism 226 controls turning (i.e., pivoting) of the front wheels 216 based on rotation of the steering column 220.

The driver selects a mode of operation for the vehicle using a mode selection device, such as a park, reverse, drive, neutral lever (PRNDL) 228. A drive mode for the front and/or rear wheels 216 and 218 is selected using a drive mode selector 230. For example only, the driver may select two-wheel drive, four-wheel drive (high or low), or all-wheel drive using the drive mode selector 230. In other vehicle systems, such as a front-wheel drive vehicle system, the drive mode selector 230 may be omitted. While the present disclosure will be discussed as it relates to four-wheel or all-wheel drive vehicle, the present disclosure is also applicable to front-wheel drive vehicles.

When operating in a two-wheel drive mode, torque is transferred to the rear wheels 218 while no torque is transferred to the front wheels 216. In other words, the rear wheels 218 propel the vehicle when the driver selects the two-wheel drive mode. Torque is selectively transferred to the front and rear wheels 216 and 218 when four-wheel drive or all-wheel drive is selected.

The mode of operation and the drive mode are provided to the transmission control module 194. The ECM 114 may also receive the mode of operation and the drive mode. The transmission control module 194 controls transfer of torque output by the engine 102 to the transmission 204.

For example only, the transmission control module 194 may control torque transfer to the transmission 204 via the torque transfer device 202. The transmission control module 194 also controls transfer of torque from the transmission 204 to the front and rear wheels 216 and 218. For example only, the transmission control module 194 may control transfer of torque to the front and rear wheels 216 and 218 via the transfer case 206.

Figure 3:
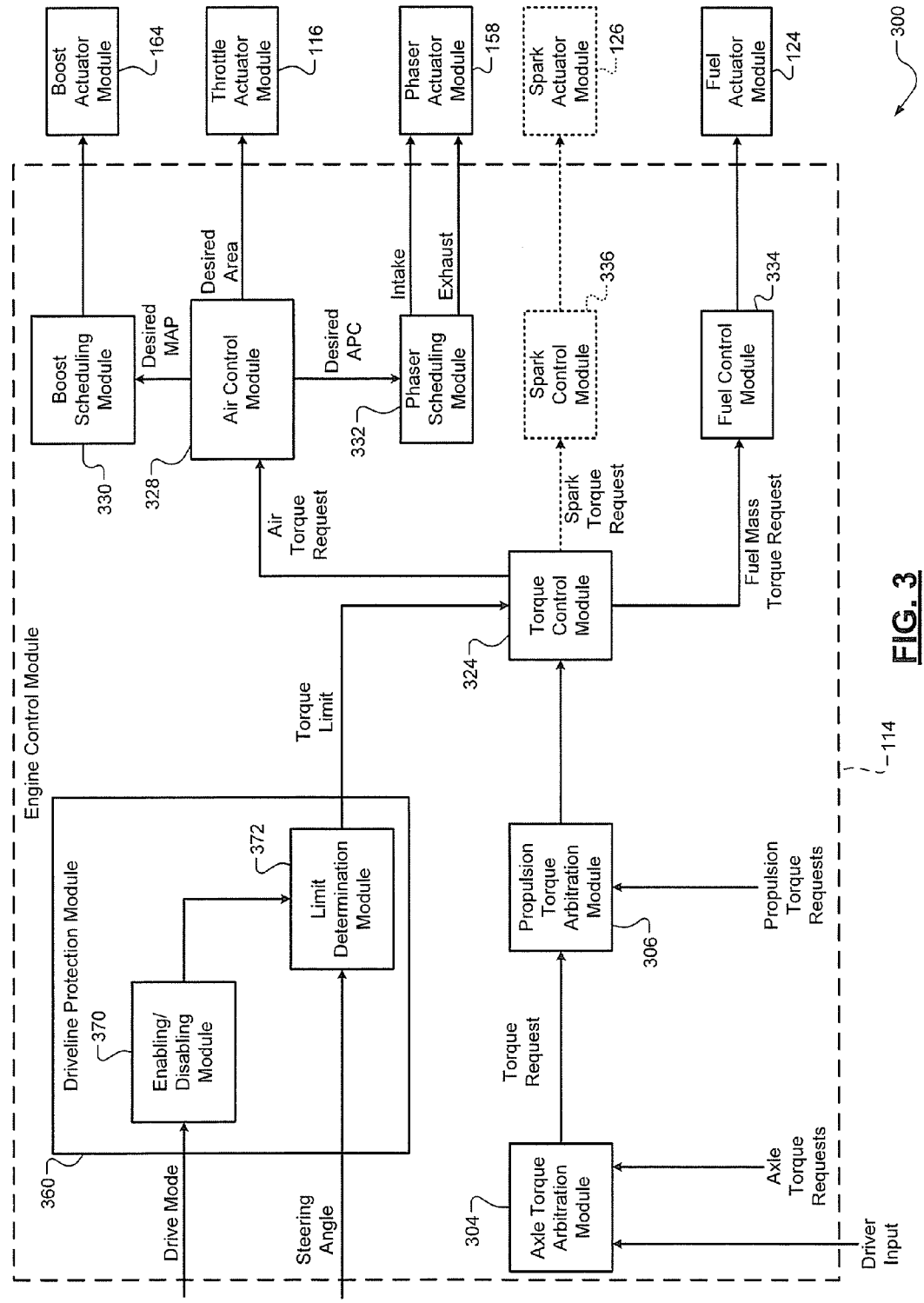
FIG. 3 is a functional block diagram of an exemplary engine control system according to the principles of the present disclosure.

Referring now to FIG. 3, a functional block diagram of an exemplary engine control system 300 including the ECM 114 is presented. An exemplary implementation of the ECM 114 includes an axle torque arbitration module 304. The axle torque arbitration module 304 arbitrates between a driver input from the driver input module 104 and other axle torque requests. For example, the driver input may be based on position of the accelerator pedal. The driver input may also be based on cruise control inputs, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 304 outputs a torque request based on the results of arbitrating between the received torque requests. The axle torque arbitration module 304 may output the torque request to a propulsion torque arbitration module 306.

In hybrid vehicle systems, the axle torque arbitration module 304 may output the torque request to, for example, a hybrid optimization module (not shown). The hybrid optimization module determines how much torque should be produced by the engine 102 and how much torque should be produced by the electric motor 198. The hybrid optimization module outputs a modified torque request to the propulsion torque arbitration module 306.

The torque request received by the propulsion torque arbitration module 306 is converted from an axle torque domain (torque at the wheels) into a propulsion torque domain (torque at the crankshaft). The propulsion torque arbitration module 306 arbitrates between propulsion torque requests and the converted torque request. The propulsion torque arbitration module 306 outputs an arbitrated torque request based on the arbitration.

The arbitrated torque request may be generated by selecting a winning request from among received requests. Alternatively or additionally, the arbitrated torque request may be generated by modifying one of the received requests based on another one or more of the received requests.

Propulsion torque requests may include, for example, torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a vehicle having a manual transmission. Propulsion torque requests may also include an engine shutoff request, which may be initiated when a critical fault is detected. For example only, critical faults may include detection of vehicle theft, a stuck starter motor, electronic throttle control problems, and unexpected torque increases.

A torque control module 324 receives the arbitrated torque request from the propulsion torque arbitration module 306. The torque control module 324 determines how the arbitrated torque request will be achieved. The torque control module 324 may be engine type specific, with different control schemes for gas engines versus diesel engines.

The torque control module 324 generates an air torque request and a fuel mass torque request based on the arbitrated torque request. An air control module 328 determines desired actuator values for engine air actuators based on the air torque request. For example only, the air control module 328 may control desired manifold absolute pressure (MAP), desired throttle area, and/or desired air per cylinder (APC). The desired MAP may be used to determine desired boost, and the desired APC may be used to determine desired cam phaser positions.

For example, the air control module 328 may generate a desired manifold absolute pressure (MAP) signal, which is output to a boost scheduling module 330. The boost scheduling module 330 uses the desired MAP signal to control the boost actuator module 164. The boost actuator module 164 then controls the one or more boost devices of the vehicle.

The air control module 328 may generate a desired area signal, which is output to the throttle actuator module 116. The throttle actuator module 116 then regulates the throttle valve 112 to produce the desired throttle area. The air control module 328 may also generate a desired air per cylinder (APC) signal, which is output to a phaser scheduling module 332. Based on the desired APC signal and the RPM signal, the phaser scheduling module 332 may control positions of the intake and/or exhaust cam phasers 148 and 150 using the phaser actuator module 158.

A fuel control module 334 controls the amount of fuel provided to each cylinder based on the fuel mass torque request from the torque control module 324. For example only, the fuel control module 334 may increase the mass of fuel provided as the fuel mass torque request increases. The fuel control module 334 controls the mass of fuel provided via the fuel actuator module 124. In diesel engine systems, control of the mass of fuel provided may be targeted to rapidly control the engine torque output.

In other engine systems, such as gasoline engine systems, the torque control module 324 may also output a spark torque request. The spark torque request may be used by a spark control module 336 to determine how much to retard the spark from a calibrated spark timing. In gasoline engine systems, controlling the spark timing (e.g., spark retard) may be targeted to rapidly control the engine torque output.

The ECM 114 according to the present disclosure includes a driveline protection module 360. The driveline protection module 360 selectively limits the engine torque output based on the steering angle measured by the steering angle sensor 222 to protect the front half shafts 212.

The driveline protection module 360 includes an enabling/disabling module 370 and a limit determination module 372. The enabling/disabling module 370 selectively enables and disables the limit determination module 372 based on the drive mode. More specifically, the enabling/disabling module 370 enables the limit determination module 372 when torque is being transferred to the front wheels 216.

For example only, the enabling/disabling module 370 enables the limit determination module 372 when the drive mode is the all-wheel drive mode or the four-wheel drive mode (high or low). The enabling/disabling module 370 disables the limit determination module 372 when the drive mode is the rear-wheel drive mode. In front-wheel drive vehicles, the limit determination module 372 may be enabled unless the vehicle is in park or neutral.

The limit determination module 372 determines the torque limit based on the steering angle measured by the steering angle sensor 222. The torque limit corresponds to a maximum engine torque output at the steering angle to protect the front half shafts 212 from potential damage. In other words, the torque limit corresponds to an engine torque output above which the front half shafts 212 may be damaged under the current steering angle.

The limit determination module 372 may determine the torque limit from, for example, a mapping of torque limits indexed by steering angle. For example only, the magnitude of torque limit may increase as the steering angle approaches the predetermined (e.g., zero or straight) steering angle. In this manner, the engine torque output may be limited to a lesser extent as the steering angle approaches the predetermined steering angle.

Conversely, the magnitude of the torque limit may decrease as the steering angle deviates from the predetermined steering angle. In this manner, the engine torque output may be limited to a greater extent as the steering angle increasingly deviates from the predetermined steering angle (i.e., as turning radius decreases).

The driveline protection module 360 may output the torque limit to, for example, the torque control module 324 as shown in FIG. 3. In other implementations, the driveline protection module 360 may output the torque limit to the propulsion torque arbitration module 306, the axle torque arbitration module 304, and/or another suitable module.

The torque control module 324 selectively limits the engine torque output to the torque limit. For example only, the torque control module 324 limits the fuel mass torque request to the torque limit in diesel engine systems. In this manner, the mass of fuel provided is limited based on the torque limit. In gasoline engine systems, the torque control module 324 may limit the spark torque request to the torque limit. In this manner, the driveline protection module 360 limits the engine torque output to the torque limit for the protection of the front half shafts 212.

Figure 4:
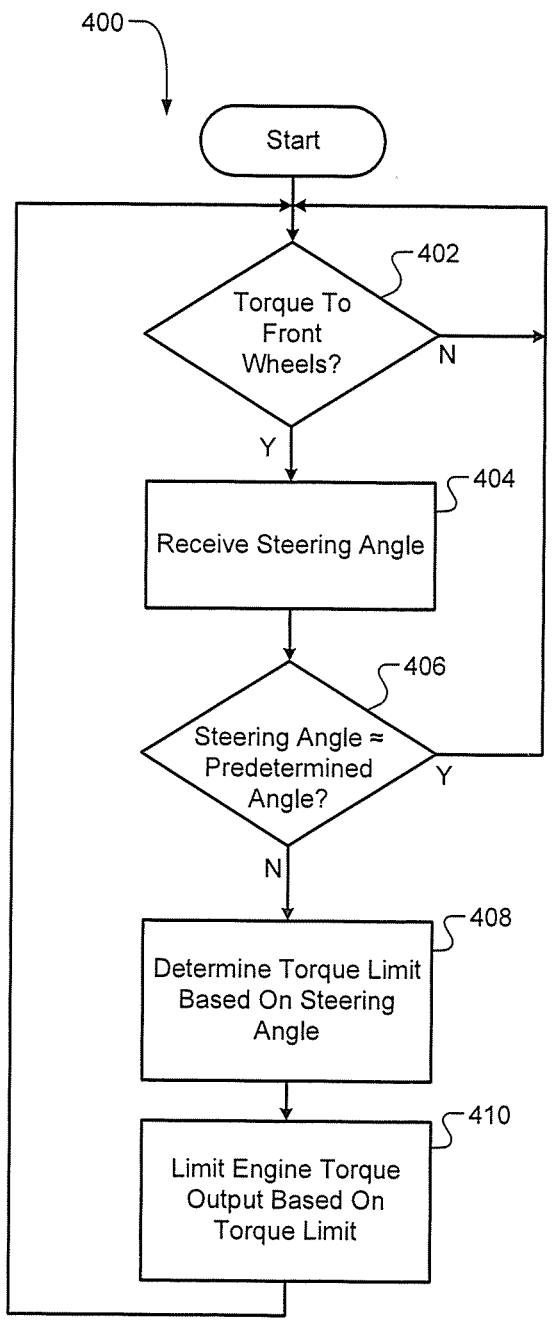
FIG. 4 is a flowchart depicting an exemplary driveline protection method according to the principles of the present disclosure.

Referring now to FIG. 4, a flowchart depicting an exemplary driveline protection method 400 is presented. The method 400 begins in step 402 where the method 400 determines whether torque is being transferred to the front wheels 216. If true, the method 400 proceeds to step 404. If false, the method 400 remains in step 402. In this manner, the method 400 is operable while torque is being transferred to the front wheels 216. In four-wheel drive vehicles, torque is being transferred to the front wheels 216 when in the four-wheel drive mode (high or low) or the all-wheel drive mode.

In step 404, the method 400 receives the steering angle measured by the steering angle sensor 222. The method 400 determines whether the steering angle is equal to or approximately equal to the predetermined angle in step 406. If true, the method 400 returns to step 402. If false, the method 400 continues to step 408. In this manner, the method 400 proceeds to limit the engine torque output during vehicle turning. In other words, the method 400 limits the engine torque output when the steering angle differs from the predetermined steering angle.

The method 400 determines the torque limit in step 408 based on the steering angle. The method 400 limits the engine torque output to the torque limit in step 410. For example only, the method 400 may limit mass of fuel provided based on the torque limit. In this manner, the method 400 limits the engine torque output to the torque limit during vehicle turning. Control then returns to step 402.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
a limit determination module that, using a mapping including torque limits indexed by steering angle, determines a torque limit based on a steering angle; and
a torque control module that selectively limits torque output by an engine to said torque limit.

2. The engine control system of claim 1 wherein said limit determination module determines said torque limit based on said steering angle and said steering angle is measured by a steering angle sensor.

3. A system comprising:
the engine control system of claim 2; and
the steering angle sensor.

4. The system of claim 3 wherein said steering angle sensor measures said steering angle based on a position of a steering column.

5. The engine control system of claim 1 further comprising:
a transmission control module that controls transfer of torque to front and rear wheels of a vehicle; and
an enabling/disabling module that selectively disables said limit determination module when said transmission control module disables said transfer of torque to said front wheels.

6. The engine control system of claim 1 further comprising an enabling/disabling module that one of enables and disables said limit determination module based on a drive mode selected for a vehicle.

7. The engine control system of claim 6 wherein said enabling/disabling module disables said limit determination module when said drive mode is a rear wheel drive mode.

8. The engine control system of claim 6 wherein said enabling/disabling module enables said limit determination module when said drive mode is one of a four-wheel drive mode and an all-wheel drive mode.

9. The engine control system of claim 1 wherein said torque control module controls fuel supplied to said engine to limit said torque output to said torque limit.

10. The engine control system of claim 1 wherein said torque control module controls spark timing to limit said torque output to said torque limit.

11. An engine control method comprising:
   using a mapping including torque limits indexed by steering angle, determining a torque limit based on a steering angle; and
   selectively limiting torque output by an engine to said torque limit.

12. The engine control method of claim 11 further comprising:
   measuring said steering angle using a steering angle sensor.

13. The engine control method of claim 12 further comprising measuring said steering angle based on a position of a steering column.

14. The engine control method of claim 11 further comprising:
   controlling transfer of torque to front and rear wheels of a vehicle; and
   selectively disabling said selectively limiting said torque output when said transfer of torque to said front wheels is disabled.

15. The engine control method of claim 11 further comprising one of enabling and disabling said selectively limiting said torque output based on a drive mode selected for a vehicle.

16. The engine control method of claim 15 further comprising disabling said selectively limiting said torque output when said drive mode is a rear wheel drive mode.

17. The engine control method of claim 15 further comprising enabling said selectively limiting said torque output when said drive mode is one of a four-wheel drive mode and an all-wheel drive mode.

18. The engine control method of claim 11 further comprising limiting an amount of fuel provided to said engine based on said torque limit.

19. The engine control method of claim 11 further comprising controlling spark timing to limit said torque output to said torque limit.

* * * * *